Figure 1:
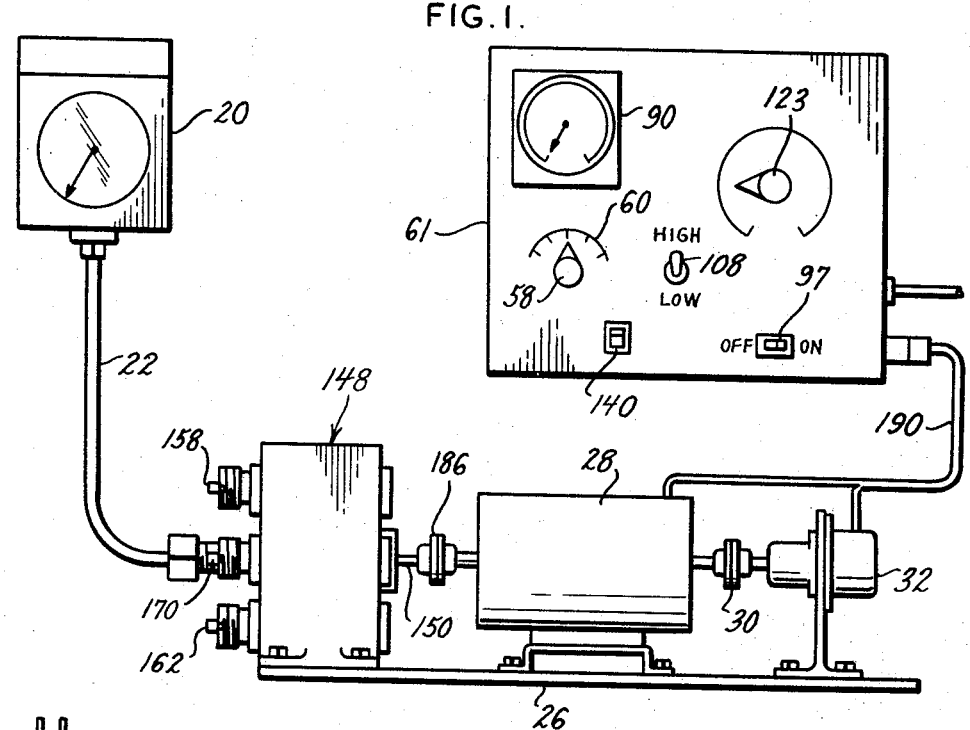

Jan. 16, 1968  J. M. KALEY  3,363,446
SYSTEM FOR CALIBRATION OF A LOCOMOTIVE SPEED RECORDER
Filed Oct. 22, 1965  2 Sheets-Sheet 1

Jan. 16, 1968   J. M. KALEY   3,363,446
SYSTEM FOR CALIBRATION OF A LOCOMOTIVE SPEED RECORDER
Filed Oct. 22, 1965   2 Sheets-Sheet 2

United States Patent Office 3,363,446
Patented Jan. 16, 1968

3,363,446
SYSTEM FOR CALIBRATION OF A LOCO-
MOTIVE SPEED RECORDER
John M. Kaley, 3107 Russell Road,
Kansas City, Mo. 64117
Filed Oct. 22, 1965, Ser. No. 501,241
8 Claims. (Cl. 73—2)

This invention relates to improvements in control systems. More particularly, this invention relates to improvements in control systems which can test the calibrations of speed recorders for railroad locomotives.

It is, therefore, an object of the present invention to provide an improved control system which can test the calibration of a speed recorder for a railroad locomotive.

Locomotives of railroads are equipped with speed recorders; and it is important that the calibrations of those speed recorders be checked periodically. The speed recorders that are most generally used on railroad locomotives in this country are manufactured by the Chicago Pneumatic Company or the Barco Manufacturing Company. The Chicago Pneumatic Company manufactures a calibrating machine; but that calibrating machine can not check the calibrations of any speed recorders other than those made by that company. That calibrating machine can be used to test the calibration of a Chicago Pneumatic Company speed recorder while that speed recorder is mounted within the cab of a railroad locomotive, or it can be used to test the calibration of such a speed recorder after that speed recorder has been removed from the cab of the locomotive and taken to a work bench. Also, that calibrating machine can be used to check the operation of the drive cable on the locomotive. However, that calibrating machine can only test a limited number of speed readings on the speed recorder, it cannot be used to check the operation of the over-speed switch on the speed recorder, the controls of that calibrating machine can not be operated within the cab of the locomotive, and that calibrating machine requires a source of sixty cycle alternating current. The Barco Manufacturing Company also manufactures a calibrating machine; and that calibrating machine will test Chicago Pneumatic Company speed recorders as well as the speed recorders made by the Barco Manufacturing Company. Further, that calibrating machine will test such speed recorders at all speeds up to one hundred and twenty miles per hour, and it can be used to check the over-speed switch of the speed recorder. However, that calibrating machine can not be used to test a speed recorder unless that speed recorder is removed from the locomotive cab and taken to a work bench, it can not be used to check the operation of the drive cable of the locomotive, it is not reversible, and it requires a source of four hundred and forty volt alternating current. It would be desirable to provide a calibrating machine which could test Chicago Pneumatic Company speed recorders and Barco Manufacturing Company speed recorders, which could test speed readings on those test recorders up to one hundred and twenty miles an hour, which could test speed recorders while they are mounted in the cab of a locomotive or after they have been removed from that cab and taken to a work bench, which could be used to check the operation of the drive cable of the locomotive, which could be used to check the operation of the over-speed switch of the speed recorder, which would be reversible and which could test the reversing mechanism in the speed recorder as well as the operation of the speed recorder in "forward" and "reverse", which could have the controls thereof operated within the cab of the locomotive, and which could be operated on the sixty-four volt D.C. power available within diesel engine locomotives. The present invention provides such a calibrating machine; and it is, therefore, an object of the present invention to provide a calibrating machine which can test Chicago Pneumatic Company speed recorders and Barco Manufacturing Company speed recorders, which can test speed readings on those speed recorders up to one hundred and twenty miles an hour, which can test speed recorders while they are mounted in the cab of a locomotive or after they have been removed from that cab and taken to a work bench, which can be used to test the operation of the drive cable of the locomotive, which can be used to check the operation of the over-speed switch of the speed recorder, which is reversible and which can test the reversing mechanism in the speed recorder as well as the operation of the speed recorder in "forward" and "reverse," which can have the controls thereof operated within the cab of the locomotive, and which can be operated on the sixty-four volt D.C. power available within diesel engine locomotives.

The calibrating machine provided by the present invention has a variable speed D.C. motor which is connected to the rotor of an A.C. generator and which is also connected to the input shaft of a gear box. That gear box is connectable to the drive cable, which normally connects the speed recorder of the locomotive to the angle drive of that locomotive; and the output of that A.C. generator is rectified and then supplied to a speed meter. Calibrated resistors are connected in series relation with the output of that A.C. generator; and the value of those resistors and the gear ratios in that gear box are made to correspond to the wheel diameters of the locomotives so that rotatable element of the drive cable will be rotated at speeds corresponding to the speeds indicated on the speed meter. The speed of the motor can be adjusted to any desired value up to a value corresponding to a locomotive speed of one hundred and twenty miles an hour; and, if the reading on the speed recorder agrees with the reading on the speed meter, that speed recorder is properly calibrated. However, if the reading on that speed recorder does not agree with the reading on the speed meter, that speed recorder must then be re-calibrated. The calibrating machine provided by the present invention can be used with a minimum of effort, and it provides a high degree of accuracy. It is, therefore, an object of the present invention to provide a calibrating machine for the speed recorders of locomotives which has a variable speed D.C. motor connected to the rotor of a generator and to the input shaft of a gear box, wherein the gear box is connectable to the drive cable of the locomotive, wherein the output of the generator is connected to a speed meter, and wherein calibrated resistances are connected in series with the output of that generator.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
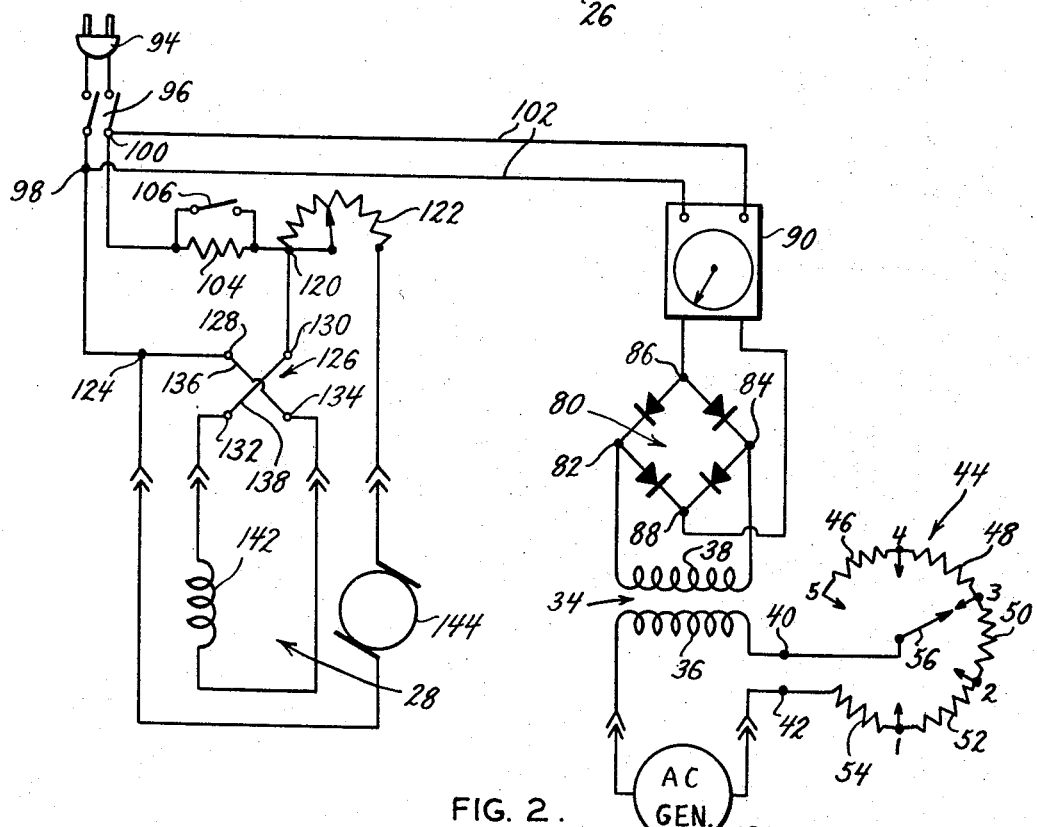
Figure 3:
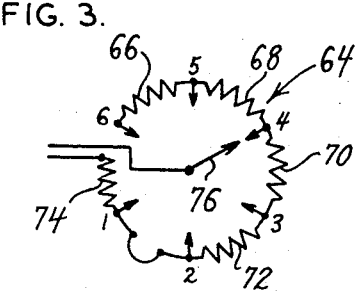
Figure 4:
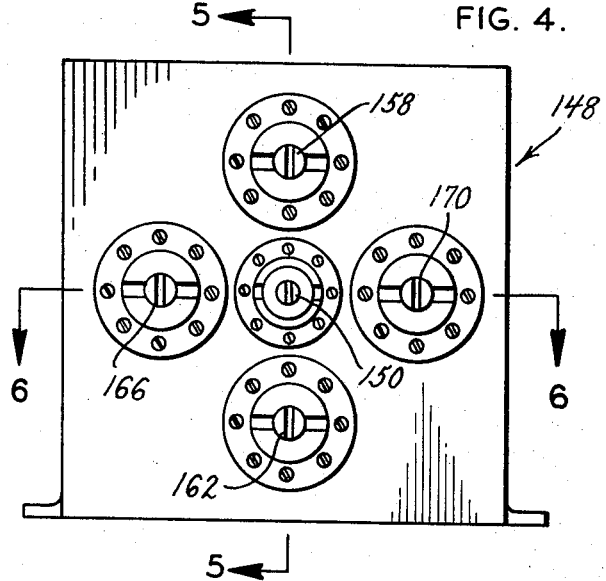
Figure 5:
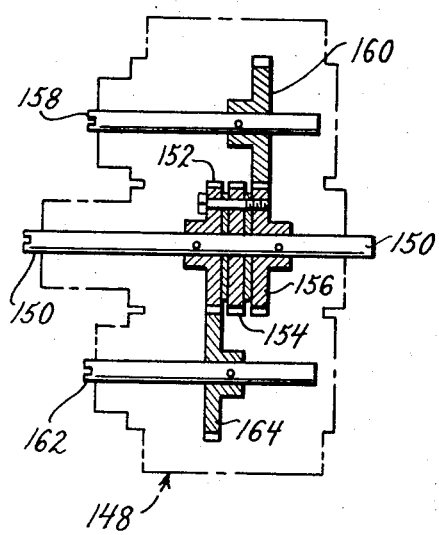
Figure 6:
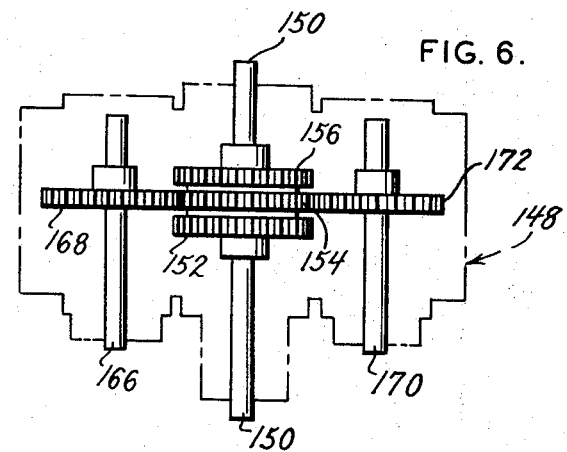
Figure 7:
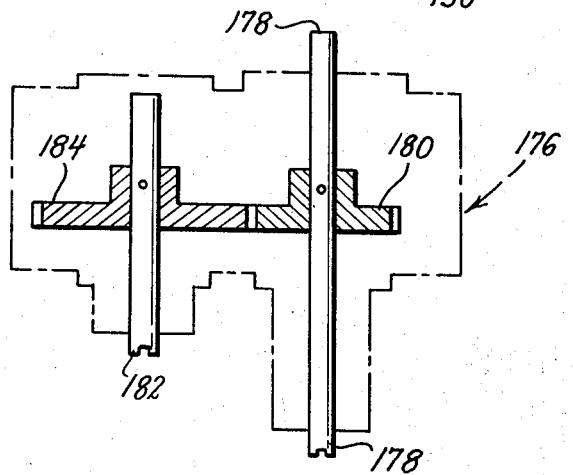

In the drawing, FIG. 1 is a diagrammatic showing of one embodiment of control system that is made in accordance with the principles and teachings of the present invention and it shows that control system connected to the speed recorder of a railroad locomotive, FIG. 2 is a schematic diagram of the electrical circuit of the control system of FIG. 1, FIG. 3 is a schematic diagram of a resistor network that can be substituted for the resistor network in the schematic diagram of FIG. 2, FIG. 4 is a front elevational view of the gear box used in the control system of FIG. 1, FIG. 5 is a diagrammatic sectional view through the gear box of FIG. 4, and it is taken along the plane indicated by the line 5—5 in FIG. 4, FIG. 6 is another diagrammatic sectional view through the gear box of FIG. 4, and it is taken along the plane indicated by the line 6—6 in FIG. 4, and FIG. 7 is a diagrammatic horizontal section through a gear box which can be substituted for the gear box of FIG. 4 in the control system of FIG. 1.

Referring to the drawing in detail, the numeral 20 denotes a speed recorder which is mounted within the cab of a railroad locomotive. That speed recorder will usually be a Chicago Pneumatic Company speed recorder or a Barco Manufacturing Company speed recorder; and it has a flexible drive cable 22 which is normally connected to the angle drive of a locomotive. The speed recorder 20 and the flexible drive cable 22 therefore are standard items of manufacture and are not, per se, parts of the present invention.

The numeral 26 denotes a platform which will preferably be mounted on a large scissors jack, not shown; and that scissors jack will preferably be mounted on a wheeled cart, not shown. That cart makes the platform 26, and the devices mounted thereon, readily portable; and that scissors jack makes it possible to set that platform and the devices mounted thereon at any desired height.

A variable speed D.C. motor 28 is mounted on the platform 26 by a suitable bracket; and the shaft of that motor projects from both ends of the housing for that motor. A flexible coupling 30 connects one end of the shaft of the motor 28 to the input shaft of an A.C. generator 32. That A.C. generator is mounted on a bracket, which is disposed to the right of the motor 28 in FIG. 1, and the input shaft of that A.C. generator is substantially coaxial with the shaft of the motor 28. The flexible coupling 30 compensates for any possible misalignments between those shafts. The numeral 34 denotes a transformer which has a primary winding 36 and a secondary winding 38; and one terminal of the primary winding 36 is connected to one of the output terminals of the A.C. generator 32 while the other terminal of that primary winding is connected to a terminal 40. The other output terminal of the A.C. generator 32 is connected to a terminal 42.

The numeral 44 generally denotes a resistor network which has fixed resistors 46, 48, 50, 52 and 54 and which also has a movable contact 56. Taps, which are numbered 1, 2, 3, 4 and 5, are provided for the resistor network 44. Tap 1 is connected between resistors 54 and 52, tap 2 is connected between resistors 52 and 50, tap 3 is connected between resistors 50 and 48, tap 4 is connected between resistors 48 and 46, and tap 5 is connected to the left-hand terminal of the resistor 46 in FIG. 2. The movable contact 56 is releasably connected to the terminal 40; and that contact can selectively engage any one of the taps 1, 2, 3, 4 and 5. The left-hand terminal of the resistor 54 is releasably connected to the terminal 42. Setting the movable contact 56 in engagement with the appropriate tap provides the desired amount of resistance intermediate the output of the A.C. generator 32 and the primary winding 36 of the transformer 34, and thus determines the voltage developed across that primary winding. A knob or handle 58 is connected to the movable contact 56 of the resistor network 44, and that knob is mounted adjacent a dial 60 on a control box 61.

The secondary winding 38 of the transformer 34 has the terminals thereof connected to the input terminals 82 and 84 of a full wave bridge rectifier 80. The output terminals 86 and 88 of that full wave bridge rectifier are connected to the input terminals of an electrically operated speed meter 90.

The numeral 94 denotes a male plug which can be inserted in a socket that is connected to a suitable source of power; and, in the schematic diagram shown in FIG. 2, the plug 94 will be inserted within a socket that is connected to a source of sixty-four volts D.C. A double pole, single throw switch 96 is connected to the plug 94, and that switch has an actuating button 97 extending through the front of the control box 61 in FIG. 1. A junction 98 is connected to one of the poles of the switch 96, and a junction 100 is connected to the other pole of that switch; and leads 102 extend from those junctions to a lamp, not shown, within the housing for the speed meter 90. A resistor 104 connects the junction 100 with a junction 120; and the latter junction is directly connected to one of the stationary contacts 130 of a double pole, double throw switch 126, is directly connected to the movable contact of a potentiometer 122, and is directly connected to the left-hand terminal of that potentiometer. The right-hand terminal of that potentiometer is connected to the armature winding 144 of the motor 28. The potentiometer 122 is thus connected as a rheostat. A knob 123 is provided for the movable contact of the potentiometer 122; and that knob is disposed at the front of the control box 61. A single pole, single throw switch 106 is connected in shunting relation with the resistor 104; and a handle 108 for that switch extends through the control box 61.

A junction 124 connects the junction 98 with the other terminal of the armature winding 144 of the motor 28, and also connects the junction 98 to the stationary contact 128 of the double pole, double throw switch 126. The remaining stationary contacts 132 and 134 of the double pole, double throw switch 126 are connected to the stator winding 142 of the motor 28. The movable contacts 136 and 138 of the double pole, double throw switch 126 are shown connecting the stationary contact 128 with the stationary contact 134 and connecting the stationary contact 130 with the stationary contact 132. However, when the movable contacts 136 and 138 are shifted to their other position, the stationary contact 128 will be connected to the stationary contact 132, and the stationary contact 130 will be connected to the stationary contact 134. The double pole, double throw switch 126 is provided with a button 140 which is disposed at the front of the control box 61; and, when that button is in one of its positions, the shaft of the motor 28 will rotate in the forward direction and when that button is in the other of its positions that shaft will rotate in the reverse direction.

The control box 61 is light in weight; and hence it can easily be carried by the operator of the control system. The conductor which extends between the left-hand terminal of primary winding 36 and the lefthand terminal of A.C. generator 32, the conductor which extends between the terminal 42 and the right-hand terminal of that A.C. generator, the conductor which extends between the armature winding 144 and the junction 124, the conductor which extends between the right-hand terminal of potentiometer 122 and that armature winding, and the conductors which extend between the stator winding 142 and the stationary contacts 132 and 134 of the double pole, double throw switch 126 are quite long; and they are parts of an elongated electrical cable 190. That elongated electrical cable permits the control box 61 to be placed within a locomotive cab during the testing of the calibration of the speed recorder in that cab, although the A.C. generator 32, the motor 28, and the gear box connected to that motor are located exteriorly of that cab.

The numeral 148 generally denotes a gear box which is disposed to the left of the motor 28 in FIG. 1; and that gear box has a shaft 150 which is substantially coaxial with the shaft of that motor. As shown particularly by FIGS. 5 and 6, the shaft 150 projects beyond the front and rear walls of that gear box. Three gears 152, 154 and 156 are fixedly secured to the shaft 150, as by having the gears 152 and 156 directly pinned to that shaft and by having all three of those gears bolted together. The gear 156 meshes with a gear 160 which is mounted on a shaft 158, the gear 152 meshes with a gear 164 which is mounted on a shaft 162, and the gear 154 meshes with gears 168 and 172 which are mounted, respectively, on shafts 166 and 170. As shown particularly by FIGS. 5 and 6, the front ends of the shafts 158, 162, 166 and 170 project outwardly beyond the front wall of the gear box 148. Those ends and the front end of the shaft 150 are provided with surfaces which can receive and drive the surface on the free end of the flexible drive cable 22 which is connected to the speed recorder 20. In the preferred embodiment of the present invention, the gear 152 has forty-eight teeth, the gear 154 has forty-nine teeth, the gear 156 has fifty teeth, the gear 160 has sixty-three teeth, the gear 164 has sixty-four teeth, the gear 168 has sixty-three teeth, and the gear 172 has sixty-four teeth. The rear portion of the shaft 150 in FIG. 1 is connected to the left-hand end of the shaft of the motor 28 by a flexible coupling 186. That flexible coupling will compensate for any possible misalignment between the shaft 150 and the shaft of the motor 28.

The numeral 176 in FIG. 7 denotes a gear box which can be substituted for the gear box 148 in the control system of FIG. 1. That gear box rotatably supports a shaft 178 which projects beyond the front and rear walls of that gear box. A gear 180 is fixedly secured to the shaft 178, as by a pin; and that gear meshes with a gear 184 which is fixedly secured to a shaft 182, as by a pin. The shaft 182 extends forwardly beyond the front wall of the gear box 176; and the front end of that shaft and the front end of the shaft 178 are provided with surfaces that can receive and drive the surface at the free end of the flexible drive cable 22. In the preferred form of the present invention, the gear 180 has fifty teeth and the gear 184 has sixty-three teeth.

The numeral 64 in FIG. 3 generally denotes a resistor network which will be substituted for the resistor network 44 in FIG. 2 whenever the gear box 176 of FIG. 7 is substituted for the gear box 148 of FIGS. 1 and 4–6. The resistor network 64 has fixed resistors 66, 68, 70, 72, and 74, and it has a movable contact 76. That resistor network is provided with taps which are numbered 1, 2, 3, 4, 5 and 6; and taps 1 and 2 are connected between resistors 74 and 72, tap 3 is connected between resistors 72 and 70, tap 4 is connected between resistors 70 and 68, tap 5 is connected between resistors 68 and 66, and tap 6 is connected to the left-hand terminal of the resistor 66, as shown by FIG. 3. The movable contact 76 is releasably connectable to the terminal 40 in FIG. 2, and the upper terminal of resistor 74 is releasably connectable to the terminal 42 in FIG. 2.

Whenever the resistor network 64 is to be substituted for the resistor network 44, the movable contact 56 and the resistor 54 of the latter network will be disconnected from the terminals 40 and 42, and the movable contact 76 and the resistor 74 of the former network will be connected to those terminals. The resistor networks 44 and 64 are made so either of them can be mounted in the control box 61 and can have the control knob 58 secured to the movable contact thereof; and, where that is done, an appropriate dial 60 will be provided for each resistor network and will be mounted adjacent the knob 58 whenever that network is mounted in the control box 61. The dial 60 for the resistor network 44 will have five positions, whereas the dial 60 for the resistor network 64 will have six positions. Where the gear box 176 is to be used in place of the gear box 148, the shaft 150 will be freed from the flexible coupling 186 and the gear box 148 will be removed from the platform 26, the gear box 176 will be mounted on the platform 26 in place of the gear box 148, and the rear portion of the shaft 178 will be connected to the flexible coupling 186.

The surfaces on the front ends of shaft 150 of the gear box 148 and of shaft 178 of the gear box 176 are formed and dimensioned to engage and drive the surface on the free end of a flexible drive cable 22 connected to a Barco Manufacturing Company speed recorder. The front ends of shafts 158, 162, 166 and 170 of the gear box 148 and the shaft 182 of the gear box 176 are formed and dimensioned to engage and drive the free end of a flexible drive cable 22 connected to a Chicago Pneumatic Company speed recorder. As a result, either of the gear boxes 148 and 172 can be used to test the speed recorders made by the Barco Manufacturing Company or to test the speed recorders made by the Chicago Pneumatic Company.

In using the control system provided by the present invention, the wheeled cart will be moved into position adjacent a locomotive, and the platform 26 will be set at a level close to that of the angle drive of that locomotive. Thereupon, the flexible drive cable 22 will be disconnected from the angle drive of the locomotive and will be connected to one of the output shafts of one of the gear boxes 148 and 176. If it is assumed that the control system is equipped with the gear box 148 and the resistor network 44, and if it is assumed that the control system is to be used to test the calibration of a speed recorder made by the Chicago Pneumatic Company, the operator will measure the diameter of the driving wheel of the locomotive to which the speed recorder drive arrangement is attached and will then connect the free end of the flexible drive cable 22 to the appropriate output shaft of the gear box 148. For example, if the diameter of that driving wheel is between thirty-seven and four-tenths of an inch and thirty-eight and two-tenths of an inch, the free end of the flexible drive cable 22 will be connected to the front end of the output shaft 162. If the diameter of that driving wheel is between thirty-eight and two-tenths of an inch and thirty-eight and nine-tenths of an inch, the free end of that flexible drive cable will be connected to the front end of the output shaft 170. If the diameter of that driving wheel is between thirty-eight and nine-tenths of an inch and thirty-nine and six-tenths of an inch, the free end of that flexible drive cable will be connected to the front end of the output shaft 166. If the diameter of that driving wheel is between thirty-nine and six-tenths of an inch and forty and three-tenths of an inch, the free end of that flexible drive cable will be connected to the front end of the output shaft 158. In any instance where the driving wheels of a locomotive are smaller than thirty-seven and four-tenths of an inch in diameter or are larger than forty and three-tenths of an inch in diameter, a gear box can easily be designed and built to provide the proper ratio between the input shaft 150 and any of the output shafts 158, 162, 166 and 170. In selecting the gears to be used within that gear box, the following equation should be used:

$$\frac{\text{Number of Teeth on Drive Gear}}{\text{Number of Teeth on Driven Gear}} \times \text{Wheel Rev. per Mile} =$$

396 r.p.m. output to speed recorder

Once the size of the driving wheel has been determined and the free end of the flexible drive cable 22 has been connected to the front end of the appropriate output shaft, the knob 58 will be set to dispose the movable contact 56 in register with the appropriate tap. If the diameter of the driving wheel is closer to forty and three-tenths of an inch than it is to thirty-nine and six-tenths of an inch, the knob 58 will be set to dispose the movable contact 56 in engagement with tap 1 of resistor network 44. If the diameter of the driving wheel is closer to thirty-nine and six-tenths of an inch than it is to forty and three-tenths of an inch or to thirty-eight and nine-tenths of an inch, the knob 58 will be set to dispose the movable contact 56 in engagement with tap 2. If the diameter of the driving wheel is closer to thirty-eight and nine-tenths of an inch than it is to thirty-nine and six-tenths of an inch or to thirty-eight and two-tenths of an inch, the knob 58 will be set to dispose the movable contact 56 in engagement with tap 3. If the diameter of the driving wheel is closer to thirty-eight and two-tenths of an inch than it is to thiry-eight and nine-tenths of an inch or to thirty-seven and four-tenths of an inch, the knob 58 will be set to dispose the movable contact 56 in engagement with tap 4. If the diameter of the driving wheel is closest to thirty-seven and four-tenths of an inch, the knob 58 will be set to dispose the movable contact 56 in engagement with tap 5.

The control box 61 will be set in the locomotive cab so the operator can easily, and almost simultaneously, view the speed recorder 20 and the speed meter 90. The connecting plug 94 will then be inserted in the sixty-four volt D.C. socket in the locomotive cab, and the button 140 of the double pole, double throw switch 126 will be moved into its "forward" position. The handle 108 of the switch 106 will be moved down into its low speed position; and, whenever that handle is in that position, the switch 106 will be "open" and the resistor 104 will be in series with the armature and stator windings 144 and 142, respectively. The knob 123 of the potentiometer 122 will be moved to a position corresponding to a speed of about twenty-five miles per hour; and then the button 97 of the double-pole, single throw switch 96 will be moved to close that switch. Thereupon, current will flow from one prong of plug 94 via the right-hand movable contact of switch 96, junction 100, the upper lead 102, the lamp in the housing of speed meter 90, the lower lead 102, junction 98, and the left-hand movable contact of switch 96 to the other prong of the plug 94. Current also will flow from the right-hand prong of the plug 94, the right-hand movable contact of switch 96, junction 100, and the resistor 104 to the junction 120; and then part of that current will flow through the movable contact and right-hand section of potentiometer 122 and the armature winding 144 to the junction 124, while the rest of that current will flow through contacts 130, 138 and 132, the stator winding 142, and the contacts 134, 136 and 128 to the junction 124, and then the combined current will flow through junction 98 and the left-hand movable contact to the left-hand prong of the plug 94. The resulting energization of the motor 28 will cause the shaft of that motor to rotate the rotor of the A.C. generator 32 and the input shaft 150 of the gear box 148 in the "forward" direction.

The appropriate gear train in the gear box 148 will cause the rotatable element of the flexible drive cable 22 to cause the speed recorder 20 to indicate a speed. The rotation of the rotor of the A.C. generator 32 will cause that generator to supply alternating current to the input terminals 82 and 84 of the full wave bridge rectifier 80, and the output terminals of that full wave bridge rectifier will supply a D.C. voltage to the input terminals of the speed meter 90. If the operator correctly measured the diameter of the driving wheel, if he connected the free end of the flexible drive cable 22 to the front end of the appropriate output shaft of the gear box 148, and if he set the knob 58 in its correct position—and all of these things are simply and easily done—the reading on the speed meter 90 and the reading on the speed recorder 20 should be the same.

If the reading on the speed recorder 20 is the same as the reading on the speed meter 90, the knob 123 of the potentiometer 122 will be adjusted to cause the motor 28 to drive the speed recorder 20 at different speeds. The A.C. generator 32 will be driven at corresponding speeds; and hence the readings on the speed recorder 20 and on the speed meter 90 should always be the same. By appropriate adjustments of the positions of the knob 123, the readings of the speed recorder 20 at speeds from zero miles per hour to sixty-five miles per hour can be checked.

If it is desirable to check the calibration of the speed recorder 20 at speeds in excess of sixty-five miles per hour, the knob 123 of the potentiometer 122 should again be set in a position corresponding to about twenty-five miles per hour, and the handle 108 of the switch 106 should be moved up into the high speed position shown by FIG. 1. That movement will close the switch 106 and "short out" the resistor 104; and the "shorting out" of that resistor will increase the speed of the motor 28—thereby driving the rotatable element of the speed recorder 20 at a higher speed and also driving the rotor of the A.C. generator 32 at a higher speed. By appropriate adjustments of the knob 123 of the potentiometer, the readings of the speed recorder at speeds up to about one hundred and twenty miles per hour can be checked.

Whenever it is desirable to test the readings which the speed recorder 20 provides when it is operating in the reverse direction, the knob 123 of the potentiometer 122 should again be set in a position corresponding to about twenty-five miles per hour, and the button 97 of the switch 96 should be moved to its "off" position. After the shaft of the motor 28 has come to rest, the button 140 of the double pole, double throw switch 126 should be shifted so the movable contact 136 connects contacts 128 and 132 together and so the movable contact 138 connects contacts 130 and 134 together. Thereafter, the button 97 of the switch 96 will be moved back to its "on" position, and then the knob 123 of the potentiometer 122 can be appropriately set to cause the shaft of the motor 28 to rotate at desired speeds. While that shaft is rotating at those various speeds, a visual comparison can easily be made between the readings on the speed meter 90 and the readings on the speed recorder 20. The shaft of the motor 28 can be driven in the "reverse" direction at high speeds or at low speeds by appropriate setting of the handle 108 and by appropriate setting of the knob 123 of the potentiometer 122.

The over-speed switch of the speed recorder 20 can be set to operate at any desired speed during the testing of the calibration of that speed recorder. If that switch operates when the reading on the speed meter 90 indicates that the said speed has been attained, that over-speed switch does not need recalibration for that speed. Where that over-speed switch is tested at several speeds, throughout its anticipated range of useful speeds, and operates at the speeds indicated by the speed meter 90, no recalibration of that over-speed switch will be needed.

If the speed recorder 20 is made by the Barco Manufacturing Company, the flexible drive cable 22 will be connected to the front end of the shaft 150; and the operator will measure the diameter of the driving wheel of the locomotive to which the speed recorder drive arrangement is attached. If the diameter of that driving wheel is closer to forty and three-tenths of an inch than it is to thirty-nine and six-tenths of an inch, the knob 58 will be set to dispose the movable contact 56 in engagement with tap 1 of the resistor network 44. If the diameter of the driving wheel is closer to thirty-nine and six-tenths of an inch than it is to forty and three-tenths of an inch or to thirty-eight and nine-tenths of an inch, the knob 58 will be set to dispose the movable contact 56 in engagement with tap 2. If the diameter of the driving wheel is closer to thirty-eight and nine-tenths of an inch than it is to thirty-nine and six-tenths of an inch or to thirty-eight and two-tenths of an inch, the knob 58 will be set to dispose the movable contact 56 in engagement with tap 3. If the diameter of the driving wheel is closer to thirty-eight and two-tenths of an inch than it is to thirty-eight and nine-tenths of an inch or to thirty-seven and four-tenths of an inch, the knob 58 will be set to dispose the movable contact 56 in engagement with tap 4. If the diameter of the driving wheel is closest to thirty-seven and four-tenths of an inch, the knob 58 will be set to dispose the movable contact 56 in engagement with tap 5.

The control box 61 will be set in the locomotive cab so the operator can easily, and almost simultaneously, view the speed recorder 20 and the speed meter 90. The connecting plug 94 will then be inserted in the sixty-four volt D.C. socket in the locomotive cab, and the button 140 of the double pole, double throw switch 126 will be moved into its "forward" position. The handle 108 of the switch 106 will be moved down into its low speed position; and, whenever that handle is in that position, the switch 106 will be "open" and the resistor 104 will be in series with the armature and stator windings 144 and 142, respectively. The knob 123 of the potentiometer 122 will be moved to a position corresponding to a speed of about twenty-five miles per hour; and then the button 97 of the double-pole, single-throw switch 96 will be moved to close that switch. Thereupon, current will flow from one prong of plug 94 via the right-hand movable contact of switch 96, junction 100, the upper lead 102, the lamp in the housing of speed meter 90, the lower lead 102, junction 98, and the left-hand movable contact of switch 96 to the other prong of the plug 94. Current also will flow from the right-hand prong of the plug 94, the right-hand movable contact of switch 96, junction 100, and the resistor 104 to the junction 120; and then part of that current will flow through the movable contact and right-hand section of potentiometer 122 and the armature winding 144 to the junction 124, while the rest of that current will flow through contacts 130, 138 and 132, the stator winding 142, and the contacts 134, 136 and 128 to the junction 124, and then the combined current will flow through junction 98 and the left-hand movable contact to the left-hand prong of the plug 94. The resulting energization of the motor 28 will cause the shaft of that motor to rotate the rotor of the A.C. generator 32 and the input shaft 150 of the gear box 148 in the "forward" direction.

The shaft 150 in the gear box 148 will cause the rotatable element of the flexible drive cable 22 to cause the speed recorder 20 to indicate a speed. The rotation of the rotor of the A.C. generator 32 will cause that generator to supply alternating current to the input terminals 82 and 84 of the full wave bridge rectifier 80, and the output terminals of that full wave rectifier will supply a D.C. voltage to the input terminals of the speed meter 90. If the operator correctly measured the diameter of the driving wheel, if he connected the free end of the flexible drive cable 22 to the front end of the shaft 150, and if he set the knob 58 in its correct position—and all of these things are simply and easily done—the reading on the speed meter 90 and the reading on the speed recorder 20 should be the same.

If the reading on the speed recorder is the same as the reading on the speed meter 90, the knob 123 of the potentiometer 122 will be adjusted to cause the motor 28 to drive the speed recorder 20 at different speeds. The A.C. generator 32 will be driven at corresponding speeds; and hence the readings on the speed recorder 20 and on the speed meter 90 should always be the same. By appropriate adjustments of the positions of the knob 123, the readings of the speed recorder 20 at speeds from zero miles per hour to sixty-five miles per hour can be checked. If it is desirable to check the calibration of the speed recorder 20 at speeds in excess of sixty-five miles per hour, the knob 123 of the potentiometer 122 should again be set in a position corresponding to about twenty-five miles per hour, and the handle 108 of the switch 106 should be moved up into the high speed position shown by FIG. 1. That movement will close the switch 106 and "short out" the resistor 104; and the "shorting out" of that resistor will increase the speed of the motor 28— thereby driving the rotatable element of the speed recorder 20 at a higher speed and also driving the rotor of the A.C. generator 32 at a higher speed. By appropriate adjustments of the position of the knob 123 of the potentiometer, the readings of the speed recorder at speeds up to about one hundred and twenty miles per hour can be checked.

Whenever it is desirable to test the readings which the speed recorder 20 provides when it is operating in the reverse direction, the knob 123 of the potentiometer 122 should again be set in a position corresponding to about twenty-five miles per hour, and the button 97 of the switch 96 should be moved to its "off" position. After the shaft of the motor 28 has come to rest, the button 140 of the double pole, double throw switch 126 should be shifted so the movable contact 136 connects contacts 128 and 132 together and so the movable contact 138 connects contacts 130 and 134 together. Thereafter, the button 97 of the switch 96 will be moved back to its "on" position, and then the knob 123 of the potentiometer 122 can be appropriately set to cause the shaft of the motor 28 to rotate at desired speeds. While that shaft is rotating at those various speeds, a visual comparison can easily be made between the readings on the speed meter 90 and the readings on the speed recorder 20. The shaft of the motor 28 can be driven in the "reverse" direction at high speeds or at low speeds by appropriate setting of the handle 108 and by appropriate setting of the knob 123 of the potentiometer 122.

The over-speed switch of the Barco Manufacturing Company speed recorder 20 can easily be set to operate at any desired speed during the testing of the calibration of that speed recorder. If that switch operates, when the reading on the speed meter indicates that the said speed has been attained, that overspeed switch does not need re-calibration for that speed. Where that over-speed switch is tested at several speeds, throughout its anticipated range of useful speeds, and operates at the speeds indicated by the speed meter 90, no re-calibration of that over-speed switch will be needed.

It will thus be apparent that the procedure for testing the calibration of a Barco Manufacturing Company speed recorder with the control system of FIG. 1 differs from the procedure for testing the calibration of a Chicago Pneumatic Company speed recorder with that control system only in the connecting of the flexible drive cable 22 to the output shaft 150 when a Barco Manufacturing Company speed recorder is being tested while the free end of that flexible drive cable must be connected to the appropriate one of four output shafts if the speed recorder is a Chicago Pneumatic Company speed recorder. This is due to the fact that the Barco Manufacturing Company speed recorders have speed-compensating units built into them.

If the driving wheel of a locomotive which is equipped with a Barco Manufacturing Company speed recorder is larger than forty and three-tenths of an inch, an additional tap and an additional resistor must be provided for the resistor network 44. If the driving wheel of a locomotive which is equipped with a Barco Manufacturing Company speed recorder is smaller than thirty-seven and three-tenths of an inch, an additional tap and an additional resistor must be provided for the resistor network 44.

If the control system provided by the present invention is equipped with the gear box 176 instead of the gear box 148 and is equipped with the resistor network 64 instead of the resistor network 44, and if that control system is to be used to test the calibration of a Barco Manufacturing Company speed recorder, the flexible drive cable 22 will be disconnected from the angle drive of the locomotive and will be connected to the forward end of the output shaft 178 in FIG. 7. The operator will then measure the diameter of the driving wheel of the locomotive to which the speed recorder drive arrangement is attached and appropriately set the knob 58 of the resistor network 64. If the diameter of the driving wheel is between forty and three-tenths of an inch and thirty-nine and five-tenths of an inch, that knob will be set to dispose the movable contact 76 in engagement with tap 2. If the diameter of the driving wheel is between thirty-nine and five-tenths of an inch and thirty-eight and seven-tenths of an inch, the knob 58 will be set to dispose the movable contact 76 in engagement with tap 3. If the diameter of the driving wheel is between thirty-eight and seven-tenths of an inch and thirty-seven and nine-tenths of an inch, the knob 58 will be set to dispose the movable contact 76 in engagement with the tap 4. If the diameter of the driving wheel is between thirty-seven and nine-tenths of an inch and thirty-seven and two-tenths of an inch, the knob 58 will be set to dispose the movable contact 76 in engagement with tap 5. If the diameter of the driving wheel is thirty-seven and two-tenths of an inch, the knob 58 will be set to dispose the movable contact 76 in engagement with tap 6. Thereafter, the operator will follow the procedure outlined hereinbefore in connection with the use of the control system of FIG. 1 in testing the calibration of a Barco Manufacturing Company speed recorder 20.

If the control system provided by the present invention is equipped with the gear box 176 and with the resistor network 64, and if that control system is to be used to test the calibration of a Chicago Pneumatic Company speed recorder, the operator will connect the free end of the flexible drive cable 22 to the forward end of the shaft 182 in FIG. 7. Thereafter, the operator will set the knob 58 of the resistor network 64 to dispose the movable contact 76 in engagement with tap 1; and then he will perform the steps set out hereinbefore in connection with the use of the control system of FIG. 1 in testing the calibration of a Chicago Pneumatic Company speed recorder 20.

When the control system of the present invention is equipped with the gear box 148 and the resistor network 44, the operator must connect the free end of the flexible drive cable 22 to the appropriate one of the four output shafts 158, 162, 166 and 170 if the speed recorder 20 is made by the Chicago Pneumatic Company: whereas that operator can connect the free end of that flexible drive cable to the front end of just one output shaft, namely, the output shaft 182, when that control system is equipped with the gear box 176 and the resistor network 64. Consequently, it will usually be desirable to equip the control system of the present invention with the gear box 176 and the resistor network 64.

The control system provided by the present invention is very desirable because it can be used to test the calibration of speed recorders that are made by the Barco Manufacturing Company as well as the speed recorders made by the Chicago Pneumatic Company, because it can test the calibrations of those speed recorders at all speeds up to one hundred and twenty miles per hour, because it can be used at a work bench or at track side, because it can be used to check the operation of the flexible drive cable of the locomotive, because it can be used to check the operation of the over-speed switch on those speed recorders, because it can be operated with the sixty-four volt D.C. power available on diesel locomotives, because it can test the speed-compensating unit built into the speed recorders of the Barco Manufacturing Company, because it can be reversed to test the reversing mechanisms in the speed recorders and to test the operations of the speed recorders in "forward" and "reverse" and because it has a control box 61 which can be set within the locomotive cab to permit easy and almost simultaneous viewing of the speed recorder and the speed meter 90. The use of the control system provided by the present invention has been found to materially reduce the cost of calibrating speed recorders: and it has been found to facilitate the recalibrating of speed recorders without requiring them to be removed from their mountings within the locomotive cabs.

Whereas the drawing and accompanying description have shown and described a preferred embodiment of the present invention, it should be apparent to those skilled in the art that various changes may be made in the form of the invention without affecting the scope therefor.

What I claim is:
1. A control system for testing the calibration of the speed recorder of a railroad locomotive which comprises:
   (a) a variable speed, reversible direction, D.C. motor,
   (b) an adjustable resistor which is connected in series with said D.C. motor and which is adjustable to vary the speed of the rotor of said motor,
   (c) an A.C. generator which has the rotor thereof connected to and driven by the rotor of said D.C. motor,
   (d) a gear box which has a plurality of gear trains therein,
   (e) said gear box having a common input which is connected to the rotor of said D.C. motor and having a plurality of outputs which are selectively connectable to the free end of the flexible drive cable of said speed recorder,
   (f) a transformer,
   (g) a multi-position selector switch and a plurality of resistors associated therewith connected in series with the output of said A.C. generator and the primary winding of said transformer,
   (h) a full wave bridge rectifier having its input connected to the secondary winding of said transformer,
   (i) an electrically-operated speed meter connected to the output of said full wave bridge rectifier,
   (j) a reversing switch that is actuatable to reverse the direction of rotation of said rotor of said motor,
   (k) a further resistor in series with said adjustable resistor,
   (l) a low resistance shunt connectable in parallel with said further resistor,
   (m) said rotor of said motor simultaneously driving said common input of said gear box and said rotor of said A.C. generator,
   (n) said transformer and said full wave bridge rectifier supplying a D.C. current to said speed meter which is proportional to the speed of rotation of said rotor of said A.C. generator,
   (o) said multi-position selector switch and said plurality of resistors associated therewith limiting the current flowing through said speed meter,
   (p) said plurality of resistors associated with said multi-position selector switch being correlated to the diameter of the locomotive driving wheel to which said speed recorder is connected,
   (q) whereby appropriate selection of the setting of said multi-position selector switch provides a direct relationship between the readings on said speed recorder and the readings on said speed meter,
   (r) said rotor of said motor being reversible to drive said speed recorder in the reverse direction,
   (s) a control box which carries said speed meter, said adjustable resistor, said multi-position selector switch and said plurality of resistors, said reversing switch, said further resistor, and said low-resistance shunt, and
   (t) an elongated electrical cable extending between said control box and said motor and said A.C. generator, whereby said control box can be disposed within the cab of a locomotive,
   (u) the outputs of said gear box being usable to drive the flexible drive cables of different makes of speed recorders,
   (v) said gear box being one of a plurality of interchangeable gear boxes,
   (w) said multi-position selector switch and said plurality of resistors being one of a plurality of multi-position selector switches and plurality of resistors.
2. A control system for testing the calibration of the speed recorder of a railroad locomotive which comprises:
   (a) a variable speed, reversible direction, D.C. motor,
   (b) an adjustable element which is adjustable to vary the speed of the rotor of said motor,
   (c) an A.C. generator which has the rotor thereof connected to and driven by the rotor of said D.C. motor,

(d) a gear box which has a plurality of gear trains therein,
(e) said gear box having a common input which is connected to the rotor of said D.C. motor and having a plurality of outputs which are selectively connectable to the free end of the flexible drive cable of said speed recorder,
(f) a transformer,
(g) a multi-position selector switch and a plurality of resistors associated therewith connected in series with the output of said A.C. generator and the primary winding of said transformer,
(h) a rectifier having its input connected to the secondary winding of said transformer,
(i) an electrically-operated speed meter connected to the output of said rectifier,
(j) a reversing switch that is actuatable to reverse the direction of rotation of said rotor of said motor,
(k) a further resistor in series with said adjustable element,
(l) a low resistance shunt connectable in parallel with said further resistor,
(m) said rotor of said motor simultaneously driving said common input of said gear box and said rotor of said A.C. generator,
(n) said transformer and said rectifier supplying a D.C. current to said speed meter which is proportional to the speed of rotation of said rotor of said A.C. generator,
(o) said multi-position selector switch and said plurality of resistors associated therewith limiting the current flowing through said speed meter,
(p) said plurality of resistors associated with said multi-position selector switch being correlated to the diameter of the locomotive driving wheel to which said speed recorder is connected,
(q) whereby appropriate selection of the setting of said multi-position selector switch provides a direct relationship between the readings on said speed recorder and the readings on said speed meter,
(r) said rotor of said motor being reversible to drive said speed recorder in the reverse direction,
(s) a control box which carries said speed meter, said adjustable element, said multi-position selector switch and said plurality of resistors, said reversing switch, said further resistor, and said low-resistance shunt, and
(t) an elongated electrical cable extending between said control box and said motor and said A.C. generator, whereby said control box can be disposed within the cab of a locomotive,
(u) the outputs of said gear box being usable to drive the flexible drive cables of different makes of speed recorders.

3. A control system for testing the calibration of the speed recorder of a railroad locomotive which comprises:
(a) a variable speed, reversible direction, D.C. motor,
(b) an adjustable element which is adjustable to vary the speed of the rotor of said motor,
(c) an A.C. generator which has the rotor thereof connected to and driven by the rotor of said D.C. motor,
(d) a gear box which has a plurality of gear trains therein,
(e) said gear box having a common input which is connected to the rotor of said D.C. motor and having a plurality of outputs which are selectively connectable to the free end of the flexible drive cable of said speed recorder,
(f) a transformer,
(g) a multi-position selector switch and a plurality of resistors associated therewith connected in series with the output of said A.C. generator and the primary winding of said transformer,
(h) a rectifier having its input connected to the secondary winding of said transformer,
(i) an electrically-operated speed meter connected to the output of said rectifier,
(j) a reversing switch that is actuatable to reverse the direction of rotation of said rotor of said motor,
(k) said rotor of said motor simultaneously driving said common input of said gear box and said rotor of said A.C. generator,
(l) said transformer and said rectifier supplying a D.C. current to said speed meter which is proportional to the speed of rotation of said rotor of said A.C. generator,
(m) said multi-position selector switch and said plurality of resistors associated therewith limiting the current flowing through said speed meter,
(n) said plurality of resistors associated with said multi-position selector switch being correlated to the diameter of the locomotive driving wheel to which said speed recorder is connected,
(o) whereby appropriate selection of the setting of said multi-position selector switch provides a direct relationship between the readings on said speed recorder and the readings on said speed meter,
(p) said rotor of said motor being reversible to drive said speed recorder in the reverse direction,
(q) a control box which carries said speed meter, said adjustable element, said multi-position selector switch and said plurality of resistors, and said reversing switch, and
(r) an elognated electrical cable extending between said control box and said motor and said A.C. generator, whereby said control box can be disposed within the cab of a locomotive,
(s) the outputs of said gear box being usable to drive the flexible drive cables of different makes of speed recorders.

4. A control system for testing the calibration of the speed recorder of a railroad locomotive which comprises:
(a) a variable speed, reversible direction motor,
(b) an adjustable element which is adjustable to vary the speed of the rotor of said motor,
(c) a generator which has the rotor thereof connected to and driven by the rotor of said motor,
(d) a gear box which has a plurality of gear trains therein,
(e) said gear box having a common input which is connected to the rotor of said motor and having a plurality of outputs which are selectively connectable to the free end of the flexible drive cable of said speed recorder,
(f) a multi-position selector switch and a plurality of resistors associated therewith connected in series with the output of said generator,
(g) an electrically-operated speed meter,
(h) a reversing switch that is actuatable to reverse the direction of rotation of said rotor of said motor,
(i) said rotor of said motor simultaneously driving said common input of said gear box and said rotor of said generator,
(j) said generator supplying current for said speed meter which is proportional to the speed of rotation of said rotor of said generator,
(k) said multi-position selector switch and said plurality of resistors associated therewith limiting the current flowing through said speed meter,
(l) said plurality of resistors associated with said multi-position selector switch being correlated to the diameter of the locomotive driving wheel to which said speed recorder is connected,
(m) whereby appropriate selection of the setting of said multi-position selector switch provides a direct relationship between the readings on said speed recorder and the reading on said speed meter,
(n) said rotor of said motor being reversible to drive said speed recorder in the reverse direction,
(o) a control box which carries said speed meter, said adjustable element, said multi-position selector switch and said plurality of resistors, and said reversing switch, and
(p) an elongated electrical cable extending between said control box and said motor and said generator, whereby said control box can be disposed within the cab of a locomotive,
(q) the outputs of said gear box being usable to drive the flexible drive cables of different makes of speed recorders.

5. A control system for testing the calibration of the speed recorder of a railroad locomotive which comprises:
(a) a variable speed motor,
(b) an adjustable element which is adjustable to vary the speed of the rotor of said motor,
(c) a generator which has the rotor thereof connected to and driven by the rotor of said motor,
(d) a gear box which has a plurality of gear trains therein,
(e) said gear box having a common input which is connected to the rotor of said motor and having a plurality of outputs which are selectively connectable to the free end of the flexible drive cable of said speed recorder,
(f) a multi-position selector switch and a plurality of resistors associated therewith connected in series with the output of said generator,
(g) an electrically-operated speed meter,
(h) said rotor of said motor simultaneously driving said common input of said gear box and said rotor of said generator,
(i) said generator supplying current for said speed meter which is proportional to the speed of rotation of said rotor of said generator,
(j) said multi-position selector switch and said plurality of resistors associated therewith limiting the current flowing through said speed meter,
(k) said plurality of resistors associated with said multi-position selector switch being correlated to the diameter of the locomotive driving wheel to which said speed recorder is connected,
(l) whereby appropriate selection of the setting of said multi-position selector switch provides a direct relationship between the readings on said speed recorder and the readings on said speed meter,
(m) a control box which carries said speed meter, said adjustable element, and said multi-position switch and said plurality of resistors, and
(n) an elongated electrical cable extending between said control box and said motor and said generator, whereby said control box can be disposed within the cab of a locomotive,
(o) the outputs of said gear box being usable to drive the flexible drive cables of different makes of speed recorders.

6. A control system for testing the calibration of the speed recorder of a railroad locomotive which comprises:
(a) a variable speed, reversible direction motor,
(b) an adjustable element which is adjustable to vary the speed of the rotor of said motor,
(c) a generator which has the rotor thereof connected to and driven by the rotor of said motor,
(d) a gear box which has a plurality of gear trains therein,
(e) said gear box having a common input which is connected to the rotor of said motor and having a plurality of outputs which are selectively connectable to the free end of the flexible drive cable of said speed recorder,
(f) an electrically-operated speed meter,
(g) a reversing switch that is actuatable to reverse the direction of rotation of said rotor of said motor,
(h) said rotor of said motor simultaneously driving said common input of said gear box and said rotor of said generator,
(i) said generator supplying current for said speed meter which is proportional to the speed of rotation of said rotor of said generator,
(j) said rotor of said motor being reversible to drive said speed recorder in the reverse direction,
(k) a control box which carries said speed meter, said adjustable element, and said reversing switch, and
(l) an elongated electrical cable extending between said control box and said motor and said generator, whereby said control box can be disposed within the cab of a locomotive,
(m) the outputs of said gear box being usable to drive the flexible drive cables of different makes of speed recorders.

7. A control system for testing the calibration of the speed recorder of a railroad locomotive which comprises:
(a) a variable speed, reversible direction D.C. motor,
(b) an adjustable element which is adjustable to vary the speed of the rotor of said motor,
(c) an A.C. generator which has the rotor thereof connected to and driven by the rotor of said D.C. motor,
(d) a transformer,
(e) a multi-position selector switch and a plurality of resistors associated therewith connected in series with the output of said A.C. generator and the primary winding of said transformer,
(f) a rectifier having its input connected to the secondary winding of said transformer,
(g) an electrically-operated speed meter connected to the output of said rectifier,
(h) a reversing switch that is actuatable to reverse the direction of rotation of said rotor of said motor,
(i) said rotor of said motor simultaneously driving the free end of the flexible drive cable of said speed recorder and said rotor of said generator,
(j) said rotor of said motor simultaneously driving said common input of said gear box and said rotor of said A.C. generator,
(k) said transformer and said rectifier supplying a D.C. current to said speed meter which is proportional to the speed of rotation of said rotor of said A.C. generator,
(l) said multi-position selector switch and said plurality of resistors associated therewith limiting the current flowing through said speed meter,
(m) said plurality of resistors associated with said multi-position selector switch being correlated to the diameter of the locomotive driving wheel to which said speed recorder is connected,
(n) whereby appropriate selection of the setting of said multi-position selector switch provides a direct relationship between the readings on said speed recorder and the readings on said speed meter,
(o) said rotor of said motor being reversible to drive said speed recorder in the reverse direction,
(p) a control box which carries said speed meter, said adjustable element, said multi-position selector switch and said plurality of resistors, said reversing switch, said further resistor, and said low-resistance shunt, and
(q) an elongated electrical cable extending between said control box and said motor and said A.C. generator, whereby said control box can be disposed within the cab of a locomotive.

8. A control system for testing the calibration of the speed recorder of a railroad locomotive which comprises:
(a) a variable speed motor,
(b) an adjustable element which is adjustable to vary the speed of the rotor of said motor,
(c) a generator which has the rotor thereof connected to and driven by the rotor of said motor,
(d) a multi-position selector switch and a plurality of resistors associated therewith connected in series with the output of said generator, (e) an electrically-operated speed meter,
(f) said rotor of said motor simultaneously driving the free end of the flexible drive cable of said speed recorder and said rotor of said generator,
(g) said generator supplying current for said speed meter which is proportional to the speed of rotation of said rotor of said generator,
(h) said multi-position selector switch and said plurality of resistors associated therewith limiting the current flowing through said speed meter,
(i) said plurality of resistors associated with said multi-position selector switch being correlated to the diameter of the locomotive driving wheel to which said speed recorder is connected,
(j) whereby appropriate selection of the setting of said multi-position selector switch provides a direct relationship between the readings on said speed recorder and the readings on said speed meter,
(k) a control box which carries said speed meter, said adjustable element, and said multi-position switch and said plurality of resistors, and
(l) an elongated electrical cable extending between said control box and said motor and said generator, whereby said control box can be disposed within the cab of a locomotive.

References Cited

UNITED STATES PATENTS

| | | | |
|---|---|---|---|
| 1,537,486 | 5/1925 | Miller | 73—2 |
| 1,611,089 | 12/1926 | Wallis | 73—2 |
| 1,658,055 | 2/1928 | Lillyquist | 73—2 |
| 1,871,053 | 8/1932 | Haeberle et al. | 73—2 |
| 2,210,154 | 8/1940 | Stevens et al. | 73—2 |
| 2,493,028 | 1/1950 | Putt | 73—2 |

DAVID SCHONBERG, *Primary Examiner.*

NEIL SIEGEL, *Assistant Examiner.*